United States Patent
Song et al.

(10) Patent No.: US 12,549,779 B2
(45) Date of Patent: Feb. 10, 2026

(54) METHOD AND SYSTEM FOR PROVIDING CONTENTS

(71) Applicant: NAVER CORPORATION, Seongnam-si (KR)

(72) Inventors: Jaehoon Song, Seongnam-si (KR); Soo Ha Park, Seongnam-si (KR); Mulgyeol Kang, Seongnam-si (KR); Seung Hye Lee, Seongnam-si (KR); So Ri Han, Seongnam-si (KR); Kyung Hee Yoon, Seongnam-si (KR); Eunyoung Seo, Seongnam-si (KR); Jun Young Jang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 125 days.

(21) Appl. No.: 17/371,254

(22) Filed: Jul. 9, 2021

(65) Prior Publication Data

US 2022/0182725 A1    Jun. 9, 2022

(30) Foreign Application Priority Data

Dec. 8, 2020   (KR) ........................ 10-2020-0170892

(51) Int. Cl.
*H04N 21/2187* (2011.01)
*G06F 16/738* (2019.01)
(Continued)

(52) U.S. Cl.
CPC ....... *H04N 21/2187* (2013.01); *G06F 16/738* (2019.01); *G06F 16/7867* (2019.01);
(Continued)

(58) Field of Classification Search
CPC ......... H04N 21/2187; H04N 21/47217; H04N 21/4882; H04N 21/47815; H04N 21/8456; H04N 21/4314; H04N 21/47214; H04N 21/482; H04N 21/812; H04N 21/8173; G06F 16/738; G06F 16/7867;
(Continued)

(56) References Cited

U.S. PATENT DOCUMENTS 10,028,008 B2 *   7/2018  Lewis ................ H04N 21/4314
10,438,632 B2 * 10/2019  Kauffmann .......... G11B 27/005
(Continued)

FOREIGN PATENT DOCUMENTS

JP      2020038583 A    3/2020
KR   1020070087386 A    8/2007
(Continued)

OTHER PUBLICATIONS

Todd Spangler, Hulu Adds Channel Guide to Live-TV Web User Interface, Variety, Oct. 11, 2017 (Year: 2017).*

*Primary Examiner* — Marissa Thein
*Assistant Examiner* — Anna Mae Mitros
(74) *Attorney, Agent, or Firm* — Greer Burns & Crain Ltd.

(57) ABSTRACT

A method for providing contents includes receiving a user input including a request for contents associated with a specific date, in response to the received user input, extracting one or more contents associated with the specific date, and displaying, on a display, the one or more contents through a user interface determined according to a broadcast time of the one or more contents.

13 Claims, 12 Drawing Sheets

(51) Int. Cl.
*G06F 16/78* (2019.01)
*G06Q 10/1093* (2023.01)
*G06Q 30/0601* (2023.01)
*H04N 21/472* (2011.01)
*H04N 21/478* (2011.01)
*H04N 21/488* (2011.01)
*H04N 21/845* (2011.01)

(52) U.S. Cl.
CPC ..... *G06Q 10/1093* (2013.01); *G06Q 30/0623* (2013.01); *G06Q 30/0641* (2013.01); *H04N 21/47217* (2013.01); *H04N 21/4882* (2013.01); *H04N 21/47815* (2013.01); *H04N 21/8456* (2013.01)

(58) Field of Classification Search
CPC ........... G06Q 10/1093; G06Q 30/0623; G06Q 30/0641; G06Q 30/0601–0645; G06Q 30/0624; G06Q 30/0643; G06Q 30/06431; G06Q 30/06432; G06Q 30/06433; G06Q 30/06434; G06Q 30/06435; G06Q 30/0644; G06Q 30/06442
USPC ................................................ 705/26.1–27.2
See application file for complete search history.

(56) References Cited

U.S. PATENT DOCUMENTS

| | | | | |
|---|---|---|---|---|
| 10,623,783 | B2* | 4/2020 | Barnett | H04N 21/4227 |
| 11,082,467 | B1* | 8/2021 | Hartnett | H04L 65/611 |
| 11,451,598 | B1* | 9/2022 | Chawla | G06F 16/735 |
| 2012/0278725 | A1* | 11/2012 | Gordon | H04N 21/858 715/738 |
| 2014/0366061 | A1* | 12/2014 | Kim | H04N 21/4826 725/40 |
| 2015/0281794 | A1* | 10/2015 | Choi | H04N 21/26291 725/40 |
| 2016/0283796 | A1* | 9/2016 | Henry | G06V 20/49 |
| 2017/0142047 | A1* | 5/2017 | Mendiola | H04L 51/52 |
| 2020/0252594 | A1* | 8/2020 | Lee | H04N 13/398 |
| 2022/0284495 | A1* | 9/2022 | Knezi | H04N 21/47815 |

FOREIGN PATENT DOCUMENTS

| | | |
|---|---|---|
| KR | 1020080005068 A | 1/2008 |
| KR | 1020150111095 A | 10/2015 |
| KR | 101895001 B1 | 9/2018 |

* cited by examiner

METHOD AND SYSTEM FOR PROVIDING CONTENTS

CROSS-REFERENCE TO RELATED APPLICATION

This application claims priority under 35 U.S.C § 119 to Korean Patent Application No. 10-2020-0170892, filed in the Korean Intellectual Property Office on Dec. 8, 2020, the entire contents of which are hereby incorporated by reference.

STATEMENT REGARDING PRIOR DISCLOSURES BY THE INVENTOR OR A JOINT INVENTOR biz.chosun.com/site/data/html_dir/2020/03/08/2020-030800951.html, Mar. 8, 2020; www.sedaily.com/News/NewsView/NewsPrint?Nid=1Z04B6BOP6, Mar. 8, 2020; blog.naver.com/naver_shopping/221982067306, May 28, 2020; news.naver.com/main/tool/print.nhn?oid=022&aid=0003487952, Jul. 26, 2020; blog.naver.com/naver_seller/222064764705, Aug. 19, 2020; blog.naver.com/naver_ seller/222064767001, Aug. 19, 2020; blog.naver.com/naver_seller/222064769730, Aug. 19, 2020.

BACKGROUND OF THE INVENTION

Field of Invention

The present disclosure relates to a method and system for providing contents, and more specifically, to a method and system for providing shopping contents through different user interfaces according to date or time determined based on a calendar.

Description of Related Art

In recent years, a method for providing various online product information and a form of selling products, such as TV home shopping broadcasting, Internet shopping, catalog shopping, and so on have emerged to help consumers with shopping convenience. In particular, with the development of the Internet and mobile environment and the development of broadcast video production and video provision technologies, shopping mall operators or product sellers can easily produce and provide numerous product sales broadcast videos and, accordingly, consumers can receive numerous product information in various media such as texts, images, or videos, and purchase products. For example, consumers can access live shopping channels through the Internet and watch product sales broadcast video being broadcast in real time, or consumers do not have to watch it during the corresponding broadcast time, since they can receive the recorded broadcast video later. Accordingly, consumers can receive information on various products in the form of online media regardless of time.

Since the sales broadcast videos for a large number of products are provided at various times and date through the online shopping mall services, consumers can get confused in choosing the product sales broadcast to watch. For example, in order for consumers to watch a sales broadcast for a product of interest in real time, there is a hassle in that consumers have to remember the date and time of the sales broadcast for the product of interest and search for the broadcast video.

BRIEF SUMMARY OF THE INVENTION

In order to solve the problems described above, the present disclosure provides a method, a computer program stored in a non-transitory recording medium, and an apparatus (system) for providing shopping contents.

The present disclosure may be implemented in a variety of ways, including a method, an apparatus (system), or a computer program stored in a non-transitory computer-readable recording medium.

According to an embodiment of the present disclosure, a method for providing shopping contents performed by one or more processors includes receiving a user input including a request for shopping contents associated with a specific date, in response to the received user input, extracting one or more shopping contents associated with the specific date, and displaying, on a display, the one or more shopping contents through a user interface determined according to a broadcast time of the one or more shopping contents.

According to an embodiment, there is provided a non-transitory computer-readable recording medium storing instructions for providing shopping contents described above on a computer.

A user terminal according to an embodiment includes a display, a communication module, a memory, and one or more processors connected to the memory and configured to execute one or more computer-readable programs included in the memory. The one or more programs include instructions for receiving a user input including a request for shopping contents associated with a specific date, in response to the received user input, extracting one or more shopping contents associated with the specific date, and displaying, on a display, the one or more shopping contents through a user interface determined according to a broadcast time of the one or more shopping contents.

According to various embodiments of the present disclosure, a calendar including date information for providing live broadcasting of shopping contents is provided, so that consumers can view live broadcast schedules and contents for each date at a glance, and easily recognize broadcast dates and times for products of interest.

According to various embodiments of the present disclosure, product information, shopping contents, and broadcast videos may be provided through a visually organized user interface, thus allowing consumers to efficiently select the shopping contents, watch a broadcast video, and perform product purchase.

According to various embodiments of the present disclosure, a list of broadcast videos for a plurality of shopping contents associated with a date selected by consumer through a calendar is provided, which can raise consumers' interest in the products other than the consumer's products of interest.

According to various embodiments of the present disclosure, whether or not to replay a broadcast video of shopping contents, a broadcast status indicator, and so on are displayed through different user interfaces according to the broadcast time of the shopping contents, so that consumers can intuitively recognize the broadcast status of each of the shopping contents according to time.

According to various embodiments of the present disclosure, consumers may first receive a short preview video that is automatically replayed on a user interface of each of the shopping contents, and then select whether or not to watch the entire video. As described above, consumers can receive an important section of the broadcast video of the shopping contents as a preview video, and easily check the content of the shopping contents.

According to various embodiments of the present disclosure, by the start notification setting of a video broadcast of shopping contents, consumers can watch a real-time broadcast of a product of interest at a predetermined time without directly memorizing the broadcast time of the product of interest.

BRIEF DESCRIPTION OF THE DRAWINGS

Embodiments of the present disclosure will be described with reference to the accompanying drawings described below, where similar reference numerals indicate similar elements, but are not limited thereto, in which.

DETAILED DESCRIPTION OF THE INVENTION

Figure 1:
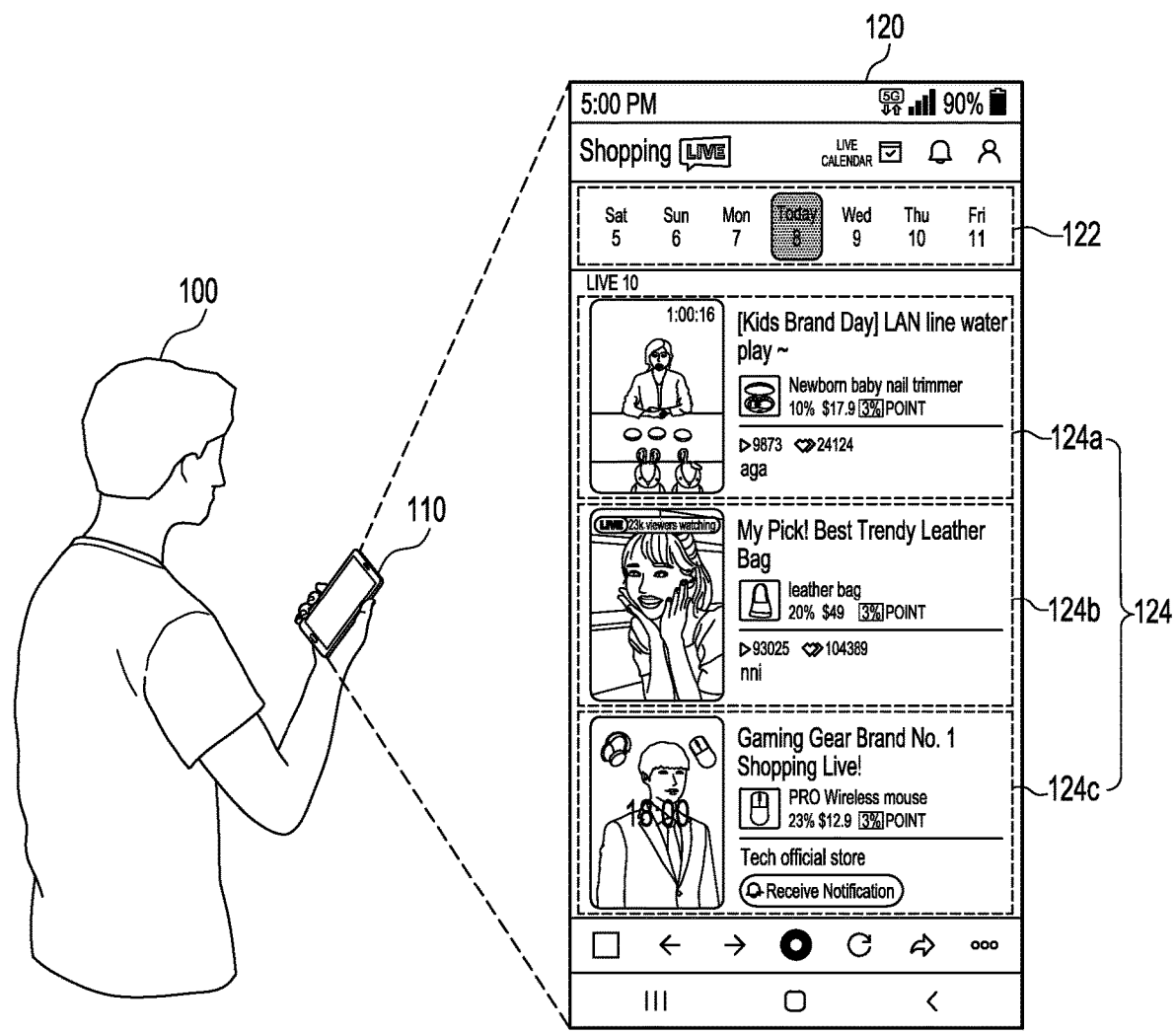
FIG. 1 is a diagram illustrating an example in which a user receives shopping contents through a screen of a user terminal according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components be not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of one skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, a "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment of the present disclosure, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory that is integral to a processor is in electronic communication with the processor.

In the present disclosure, "shopping content" may refer to information or content related to online shopping, such as broadcasting for shopping product, shopping product information, shopping payment information, shopping seller or manufacturer information, and so on, provided through an online shopping service, a social media service, and so on connected to the Internet. For example, the shopping content may include live broadcast content, recorded broadcast content, and so on for descriptions, advertisements, promotions, and so on about the products as a subject of online shopping, but is not limited thereto.

In the present disclosure, the "calendar" may generally refer to a display screen or a user interface that displays a schedule, through which it is allowed to select any date and/or time from among a plurality of dates and/or times. For example, the calendar may include a user interface through which it is allowed to select any one of a plurality of dates and/or times to perform broadcasting, replay, and provision of a plurality of shopping contents or broadcast contents. The user may select any of a plurality of dates and/or times displayed on the calendar, so as to watch or replay the shopping contents or broadcast contents provided on the corresponding date and/or time.

In the present disclosure, the "broadcast video" may refer to video data transmitted or broadcast to, or shared with, user terminals through an online shopping service, a social media service, or the like connected through the Internet. For example, in the online shopping service, the broadcast video may include all or a certain section of a pre-recorded video for description, advertisement, promotion, and so on for the product for sale, or real-time broadcasting view.

FIG. 1 is a diagram illustrating an example in which a user 100 receives shopping contents through a screen 120 provided on the display of a user terminal 110 according to an embodiment. The screen 120 illustrated in FIG. 1 shows an example in which the user 100 executes an application that provides the shopping contents in the user terminal 110 (e.g., a smartphone) and uses a service for providing shopping contents. The user terminal 110 may receive a user input including a request for shopping contents associated with a specific date from the user 100 and, in response, extract one or more shopping contents associated with the specific date. For example, the user terminal 110 may receive a touch input of the user 100 for a button (not illustrated) associated with the service for providing shopping contents. In response, the user terminal 110 may extract one or more shopping contents associated with today's date. As another example, the user terminal 110 may display, on the display, a calendar 122 including one or more dates on which the shopping contents are available, and receive, on the calendar 122, a user's touch input for a specific date. In response, the user terminal 110 may extract one or more shopping contents associated with a specific touched-inputted date.

The user terminal 110 may display the one or more extracted shopping contents on the display to provide the same to the user 100. For example, as illustrated, the user terminal 110 may display the calendar 122 including today's date and one or more shopping contents associated with today's date on the display. As another example, the user terminal 110 may display the calendar 122 including the specific touch-inputted date and one or more shopping contents associated with the specific touch-inputted date on the display. In this example, the one or more shopping contents displayed on the display may include at least one of video content for broadcasting the shopping contents, broadcast time information, broadcast status information, product information, and user response information. For example, the shopping contents may include a broadcast video, a broadcast highlight section, a broadcast start time, a replay time, a real-time broadcast indicator, product seller information, product price, discount information, the number of likes, the number of viewers, the number of real-time viewers, and so on. Meanwhile, the one or more shopping contents displayed on the display may be video content that has already been broadcast, is being broadcast, or is scheduled to be broadcast in the future.

The user terminal 110 may display one or more shopping contents on the display through a user interface 124 that is determined according to the broadcast time of the one or more shopping contents. According to an embodiment, the user terminal 110 may display one or more shopping contents received on the display using different user interfaces 124 according to a before-and-after relationship (that is, broadcast status) between the broadcast time for one or more shopping contents and a reference time point. In this example, the reference time point may be a current date and a current time when the user terminal 110 displays the shopping contents on the display.

As illustrated in FIG. 1, in the case of shopping content "[Kids Brand Day] LAN cable water play~" having a broadcast start time and a broadcast end time that are before the reference time point (that is, currently, the broadcast has ended), the user terminal 110 may replay a broadcast video for the shopping content in at least a certain area of the first user interface 124a and display "1:00:16" which is a replay time of the broadcast video. On the other hand, in the case of shopping content "My pick! Best Trendy Leather Bag!" having the broadcast start time that is before the reference time point and having the broadcast end time that is after the reference time point (that is, the content is currently being broadcast), the user terminal 110 may replay the real-time broadcast video for the shopping content in at least a certain area of the second user interface 124b, and may display "LIVE" which is the real-time broadcast indicator, and "23,000 viewers watching" which is the number of viewers of the real-time broadcast video. In addition, in the case of shopping content "Gaming Gear Brand No. 1 Shopping Live!" having the broadcast start time that is after the reference time point (that is, the content is scheduled to be broadcast), the user terminal 110 may display a thumbnail image for the shopping content and a broadcast start time "18:00" in at least a certain area of a third user interface 124c.

According to the embodiments described above, when using an application that provides live broadcasting of shopping contents, a user may select a specific date on a calendar that includes today's date, and visually efficiently check the broadcast status of a plurality of shopping contents provided on the date through a user interface associated with each of the shopping contents. More specifically, the user can simply and conveniently check the broadcast status of each shopping content according to time, based on whether or not the broadcast video of shopping content has been replayed, and based on the broadcast status indicator, and so on of the shopping contents displayed through different user interfaces.

Figure 2:
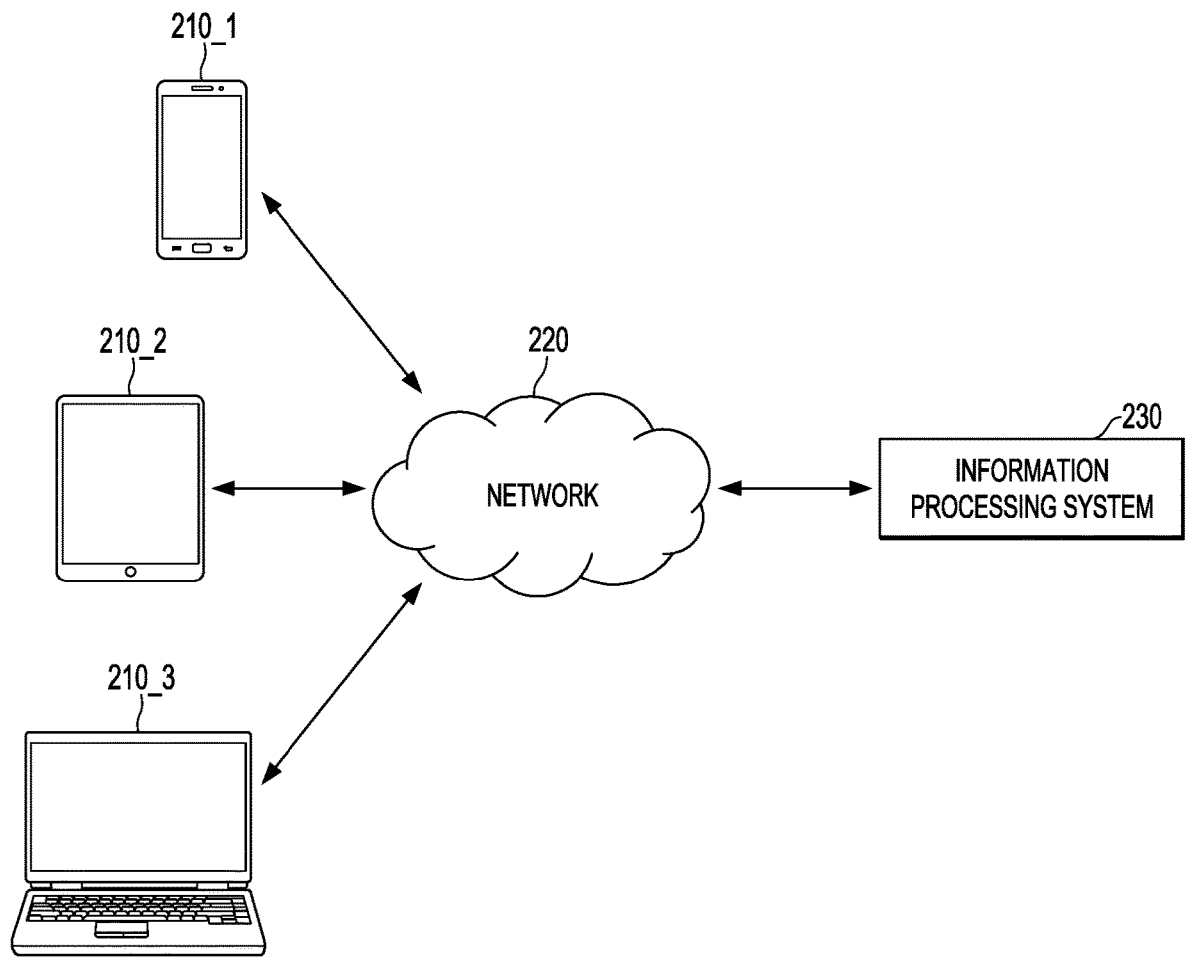
FIG. 2 is a schematic diagram illustrating a configuration in which a plurality of user terminals providing shopping contents are communicatively connected with an information processing system according to an embodiment.

FIG. 2 is a schematic diagram illustrating a configuration in which a plurality of user terminals 210_1, 210_2 and 210_3 providing shopping contents according to an embodiment are communicatively connected with an information processing system 230. As illustrated, the plurality of user terminals 210_1, 210_2 and 210_3 may be connected to the information processing system 230 that is capable of providing shopping contents through a network 220. According to an embodiment, the information processing system 230 may include one or more server devices and/or databases, or one or more distributed computing devices and/or distributed databases based on cloud computing services, which are capable of storing, providing, and executing a computer-executable program (e.g., a downloadable application) and data related to the service for providing shopping contents, analysis of user response to shopping contents, and so on.

The service for shopping contents provided by the information processing system 230 may be provided to the user through a shopping application, a search application, a mobile browser application, a web browser, and so on, which are installed in each of the plurality of user terminals 210_1, 210_2 and 210_3. For example, the information processing system 230 may provide corresponding information or perform a corresponding process to a request for shopping contents received from the user terminals 210_1, 210_2 and 210_3 through the shopping application or the like.

The plurality of user terminals 210_1, 210_2 and 210_3 may communicate with the information processing system 230 through the network 220. The network 220 may be configured to enable communication between the plurality of user terminals 210_1, 210_2 and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and so on) that may be included in the network 220 as well as short-range wireless communication between the user terminals 210_1, 210_2 and 210_3.

In FIG. 2, a mobile phone terminal 210_1, a tablet terminal 210_2, and a PC terminal 210_3 are illustrated as the examples of the user terminals, but are not limited thereto, and the user terminals 210_1, 210_2 and 210_3 may be any computing device that is capable of wired and/or wireless communication and that can be installed with a shopping application, a search application, a mobile browser application, a web browser, and so on and execute the same. For example, the user terminal may include an AI speaker, a smart phone, a mobile phone, a navigation, a computer, a notebook, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, a set-top box, and so on. In addition, FIG. 2 shows that three user terminals 210_1, 210_2 and 210_3 are in communication with the information processing system 230 through the network 220, but the present disclosure is not limited thereto, and a different number of user terminals may be configured to be in communication with the information processing system 230 through the network 220.

According to an embodiment, the information processing system 230 may receive a request for shopping contents associated with a specific date from the plurality of user terminals 210_1, 210_2 and 210_3. In response to the received request, the information processing system 230 may extract one or more shopping contents associated with the specific date and provide the same to the plurality of user terminals 210_1, 210_2 and 210_3. For example, the information processing system 230 may receive a request for shopping contents associated with today's date from the plurality of user terminals 210_1, 210_2 and 210_3, extract one or more shopping contents associated with today's date, and then provide the same to the terminals 210_1, 210_2 and 210_3.

According to an embodiment, the plurality of user terminals 210_1, 210_2 and 210_3 may receive at least one information of video content, broadcast time information, broadcast status information, product information, and user response information for broadcasting shopping contents, from the information processing system 230. For example, the information processing system 230 may provide a plurality of user terminals with a pre-stored broadcast video corresponding to the shopping contents or a real-time broadcast video.

According to an embodiment, the information processing system 230 may receive user response information to one or more shopping contents from the plurality of user terminals 210_1, 210_2 and 210_3. The information processing system 230 may extract a certain section of the video content that received the largest number of positive responses (e.g., the number of likes, the number of product sales, the number of instant viewers, and so on) during the broadcast of the video content of the shopping contents and determine it to be a highlight section, and provide video content corresponding to the determined highlight section to the plurality of user terminals 210_1, 210_2 and 210_3.

Figure 3:
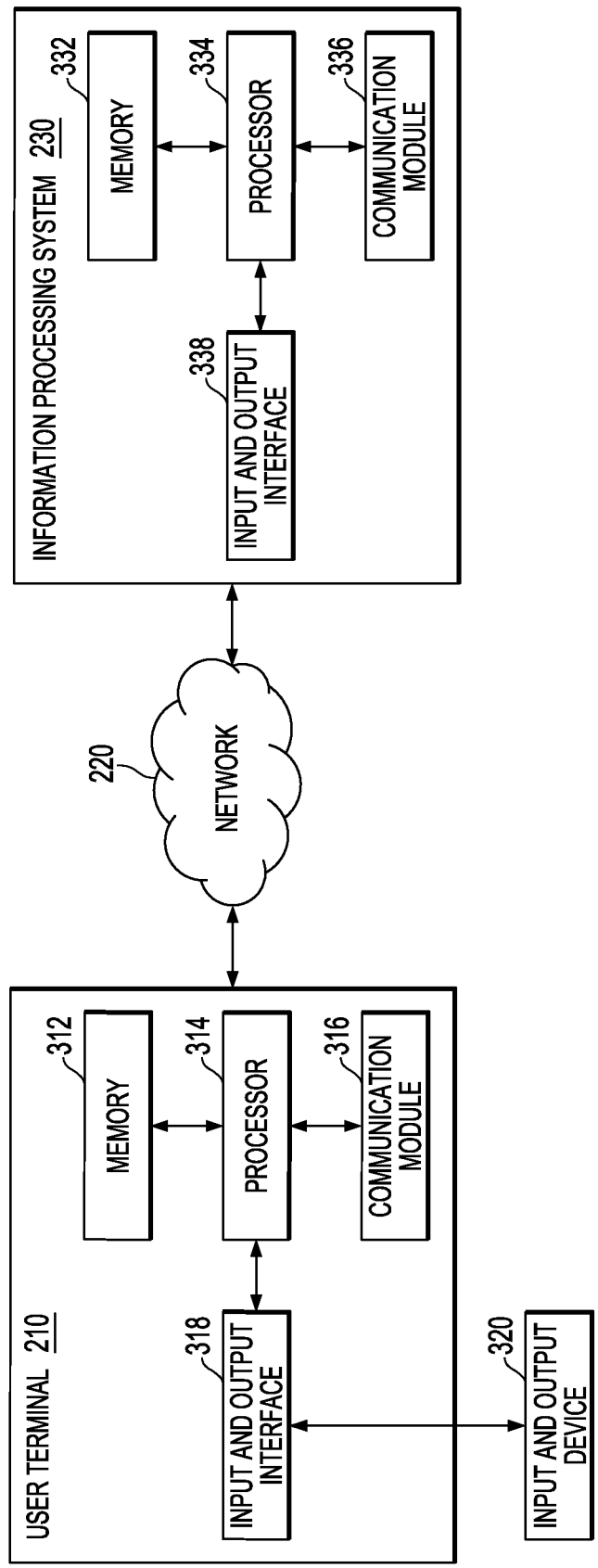
FIG. 3 is a block diagram illustrating an internal configuration of the user terminal and the information processing system according to an embodiment.

FIG. 3 is a block diagram illustrating an internal configuration of the user terminal 210 and the information processing system 230 according to an exemplary embodiment. The user terminal 210 may refer to any computing device that is capable of executing the shopping application, the search application, the mobile browser application or the web browser, and so on, and also capable of wired/wireless communication, and may include the mobile phone terminal 210_1, the tablet terminal 210_2, and the PC terminal 210_3 of FIG. 2, and so on, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As shown in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. According to an embodiment, the memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is separate from the memory. In addition, an operating system and at least one program code (e.g., a code for the shopping application, and so on installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules 316 and 336 rather than the computer-readable recording medium. For example, at least one program may be loaded into the memories 312 and 332 based on a computer program installed by files provided by developers or a file distribution system that distributes an installation file of an application through the network 220.

The processors 314 and 334 may be configured to process instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., requests for shopping contents associated with a specific date, and so on) generated by the processor 314 of the user terminal 210 according to the program code stored in the recording device such as the memory 312 or the like may be transmitted to the information processing system 230 through the network 220 under the control of the communication module 316. Conversely, a control signal or instructions provided under the control of the processor 334 of the information processing system 230 may be received by the user terminal 210 through the communication module 316 of the user terminal 210 via the communication module 336 and the network 220. For example, the user terminal 210 may receive shopping contents associated with a specific date, information on shopping contents, and so on from the information processing system 230 through the communication module 316.

The input and output interface 318 may be a means for interfacing with the input and output device 320. As an example, the input device of the input and output device 320 may include a device such as a camera, a keyboard, a microphone, and a mouse, which includes an audio sensor and/or an image sensor, and the output device of the input and output device 320 may include a device such as a display, a speaker, a haptic feedback device, and so on. As another example, the input and output interface 318 may be a means for interfacing with a device such as a touch screen or the like that integrates a configuration or function for performing inputting and outputting. For example, when the processor 314 of the user terminal 210 processes the instructions of the computer program loaded in the memory 312, a service screen or the like, which is configured with the information and/or data provided by the information processing system 230 or other user terminals, may be displayed on the display through the input and output interface 318. While FIG. 3 illustrates that the input and output device 320 is not included in the user terminal 210, embodiment is not limited thereto, and the input and output device 320 may be configured as one device with the user terminal 210. In addition, the input and output interface 338 of the information processing system 230 may be a means for interfacing with a device (not illustrated) for inputting or outputting, which may be connected to the information processing system 230 or included in the information processing system 230. In FIG. 3, the input and output interfaces 318 and 338 are illustrated as the components configured separately from the processors 314 and 334, but are not limited thereto, and the input and output interfaces 318 and 338 may be configured to be included in the processors 314 and 334, respectively.

The user terminal 210 and the information processing system 230 may include more components than the components illustrated in FIG. 3. For example, the user terminal 210 may be implemented to include at least a part of the input and output devices 320 described above. In addition, the user terminal 210 may further include other components such as a transceiver, a global positioning system (GPS) module, a camera, various sensors, a database, and so on. For example, when the user terminal 210 is a smartphone, it may include components generally included in the smartphone, and for example, it may be implemented such that various components such as an acceleration sensor, a gyro sensor, a camera module, various physical buttons, buttons using a touch panel, input and output ports, a vibrator for vibration, and so on are further included in the user terminal 210. According to an embodiment, the processor 314 of the user terminal 210 may be configured to operate an application or the like that provides shopping contents. In this case, a code associated with the application and/or program may be loaded into the memory 312 of the user terminal 210.

While a program for an application or the like that provides shopping contents is being operated, the processor 314 may receive text, image, video, audio, and/or action, and so on inputted or selected through the input device of input and output device 320 such as a camera, a microphone, and so on, that includes a touch screen, a keyboard, an audio sensor and/or an image sensor connected to the input and output interface 318. The processor 314 may store the received text, image, video, audio, and/or action, and so on in the memory 312, or provide the same to the information processing system 230 through the communication module 316 and the network 220. For example, the processor 314 may receive a user input for a notification setting button.

According to an embodiment, the processor 314 may receive through the input device 320 a user input including a request for shopping contents associated with a specific date inputted through the application or web browser that provides shopping contents, and provide the request for shopping contents to the information processing system 230 through the network 220 and the communication module 316. For example, the processor 314 may receive a user input or the like for a specific date on the calendar through the input device of the input and output device 320 such as a touch screen, a mouse, and so on, and in response to the received user input, provide the request for shopping contents associated with the specific date to the information processing system 230 through the communication module 316 and the network 220. As another example, the processor 314 may receive a user input through a button (not illustrated) associated with the shopping contents service through the input device 320 such as the touch screen, the mouse, the keyboard, and so on, and in response to the user input, transmit the request for shopping contents associated with today's date to the information processing system 230. According to an embodiment, the processor 314 may receive a user input for one or more shopping contents and, in response, transmit a request for whole pre-recorded broadcast video content or for real-time broadcast video to the information processing system 230.

The processor 314 of the user terminal 210 may be configured to manage, process, and/or store the information and/or data received from the input device of the input and output device 320, the other user terminals, the information processing system 230 and/or a plurality of external systems. The information and/or data processed by the processor 314 may be provided to the information processing system 230 through the communication module 316 and the network 220. According to an embodiment, in response to the received user input, the processor 314 may extract one or more shopping contents associated with a specific date. For example, one or more shopping contents associated with a specific date may be extracted from the memory 312 of the user terminal 210 and/or the information processing system 230. According to an embodiment, the processor 314 may determine a user interface to display the shopping contents on the display according to the broadcast time of the one or more extracted shopping contents. For example, the processor 314 may select a different user interface according to a before-and-after relationship between the broadcast time of one or more shopping contents and the reference time point. According to an embodiment, the processor 314 may determine whether or not at least a certain area of the user interface associated with the shopping contents is displayed on the display while meeting or exceeding a preset reference (e.g., the screen exposure ratio of the user interface, the screen exposure size of the user interface, the screen exposure time of the user interface). According to the determination result, the processor 314 may cause a broadcast video for shopping contents to be automatically replayed. According to an embodiment, the processor 314 may set a broadcast start notification for the shopping contents in response to a user input with respect to the notification setting button.

The processor 314 of the user terminal 210 may transmit the information and/or data to the input and output device 320 through the input and output interface 318 to output the same. For example, the processor 314 may display the received information and/or data on the screen of the user terminal 210. According to an embodiment, the processor 314 may display, on the display, the calendar including a specific date, and one or more shopping contents associated with the specific date extracted from the memory 312 and/or the information processing system 230. For example, the processor 314 may arrange a plurality of shopping contents extracted from the memory 312 and/or the information processing system 230 in the order of the broadcast start times and display them on the display. In this example, the specific date may be a date on which the shopping contents are available, and/or today's date.

The processor 314 may display one or more shopping contents on the display through a user interface that is determined according to the broadcast time of one or more shopping contents. For example, the processor 314 may display the one or more shopping contents on the display by selecting a different user interface according to the before-and-after relationship between the broadcast time of the one or more shopping contents and the reference time point.

According to an embodiment, when the broadcast start time of the shopping contents is before the reference time point, the processor 314 may replay a broadcast video for the shopping contents in at least a certain area of the user interface. At this time, when the broadcast end time for shopping contents is before the reference time point, the processor 314 may replay a preset section or a highlight section of the broadcast video for the shopping contents, and display a replay time of the broadcast video on the user interface. For example, the preset section of the broadcast video may be an initial section of the broadcast video or any section previously set by the user who uploaded the shopping contents. On the other hand, when the broadcast end time of the shopping contents is after the reference time point, the processor 314 may replay a real-time broadcast video for the shopping contents in at least a certain area of the user interface, and display, on the user interface, at least one of an indicator indicating real-time broadcasting, and the number of viewers of the real-time broadcast video.

According to one embodiment, when the broadcast start time of the shopping contents is before the reference time point, and when at least a certain area of the user interface associated with the shopping contents is displayed on the display while meeting or exceeding a preset reference, the processor 314 may automatically replay a broadcast video for the shopping contents. On the other hand, when the broadcast start time of the shopping contents is before the reference time point, but at least a certain area of the user interface is displayed on the display less than the preset reference, the processor 314 may display, on the display, at least one of a thumbnail image for the shopping contents, the broadcast start time, and the replay time.

According to an embodiment, when the broadcast start time for the shopping contents is before the reference time point, in response to the user input for the shopping contents displayed on the display, the processor 314 may display, on the display, a screen providing a broadcast video for the shopping contents. At this time, when the broadcast end time of the shopping contents is after the reference time point, the processor 314 may display, on the display, a screen providing a real-time broadcast video for the shopping contents.

According to an embodiment, when the broadcast start time of the shopping contents is after the reference time point, the processor 314 may display, on the display, at least one of the thumbnail image and the broadcast start time for the shopping contents. In addition, the processor 314 may replay a broadcast preview video for the shopping contents in at least a certain area of the user interface. In this case, the processor 314 may display a notification setting button in at least a certain area of the user interface. When the broadcast start notification is set through such the notification setting button, when the reference time point reaches the broadcast start time or a predetermined time before the broadcast start time for the shopping contents, the processor 314 may output the broadcast start notification for the shopping contents.

The processor 334 of the information processing system 230 may be configured to manage, process, and/or store information and/or data received from a plurality of user terminals 210 and/or a plurality of external systems. The information and/or data processed by the processor 334 may be provided to the user terminals 210 through the communication module 336 and the network 220. According to an embodiment, the processor 334 of the information processing system 230 may determine a highlight section of the broadcast video received from the plurality of user terminals 210 based on a user response to the corresponding broadcast video. The processor 334 may store the highlight section determined as described above in the memory 332 or provide the same to the user terminal 210.

The processor 334 of the information processing system 230 may be configured to output the processed information and/or data through the output device of the input and output device 320 such as a device (e.g., a touch screen, a display, and so on) capable of outputting a display of the user terminal 210 or a device (e.g., a speaker) capable of outputting an audio. According to an embodiment, the processor 334 of the information processing system 230 may be configured to provide one or more shopping contents associated with a specific date to the user terminal 210 through the communication module 336 and the network 220, and output the provided shopping contents through the device capable of outputting a display or the like of the user terminal 210.

Figure 4:
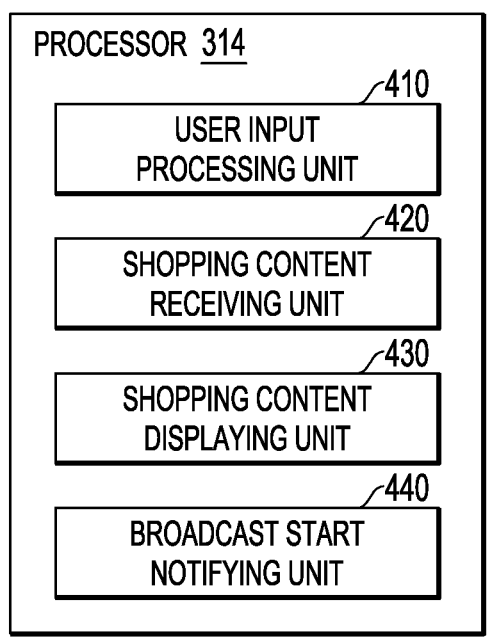
FIG. 4 is a detailed block diagram of a processor of the user terminal according to an embodiment.

FIG. 4 is a detailed block diagram of the processor 314 of the user terminal 210 according to an embodiment. As illustrated, the processor 314 may include a user input processing unit 410, a shopping content receiving unit 420, a shopping content display unit 430, and a broadcast start notifying unit 440.

The user input processing unit 410 may process a user input received through the input device and output device 320 and the input and output interface 318. For example, the user input processing unit 410 may receive a user input including a request for shopping contents associated with a specific date, and receive a user input for a specific date on a calendar that includes one or more dates on which the shopping contents are available, or a user input for one or more shopping contents. When the user input processing unit 410 receives the user input, the shopping content receiving unit 420 and the shopping content display unit 430 may be configured to process extraction of the shopping contents corresponding to the received user input, output of the shopping contents, and so on. As another example, the user input processing unit 410 may receive a user input for the notification setting button or the like, and cause the broadcast start notifying unit 440 to set the broadcast notification.

The shopping content receiving unit 420 may extract one or more shopping contents associated with a specific date according to the result of processing at the user input processing unit 410. For example, the shopping content receiving unit 420 may extract or receive one or more shopping contents associated with a specific date from the memory 312 of the user terminal 210, the information processing system 230, the external system, and/or the external storage device. In this example, the shopping contents may include at least one of video content for broadcasting the shopping contents, broadcast time information, broadcast status information, product information, and user response information.

The shopping content display unit 430 may display one or more shopping contents through a user interface that is determined according to the broadcast time of one or more shopping contents. That is, it is possible to determine the current broadcast status of the shopping contents according to the before-and-after relationship between the broadcast time of the shopping contents and the reference time point, select a different user interface according to the determination result, and display one or more shopping contents on the screen of the user terminal 210.

According to an embodiment, when the shopping content display unit 430 determines that the broadcast start time and the broadcast end time for the shopping contents are before the reference time point (that is, currently, the broadcast has ended), the user terminal 110 may replay a broadcast video for the shopping contents in at least a certain area of the interface. For example, the shopping content display unit 430 may replay a preset section or a highlight section of the broadcast video for the shopping contents. In this case, the shopping content display unit 430 may display a replay time of the broadcast video on the user interface together with the replay of the broadcast video. According to another embodiment, when the shopping content display unit 430 determines that the broadcast start time for the shopping contents is before the reference time point and the broadcast end time is after the reference time point (that is, currently, the contents are being broadcast), the shopping content display unit 430 may replay a real-time broadcast video for the shopping contents in at least a certain area of the user interface. In this case, the shopping content display unit 430 may display at least one of a real-time broadcast indicator, and the number of viewers of the real-time broadcast video. According to another embodiment, when determining that the broadcast start time for the shopping contents is after the reference time point (that is, the contents are to be broadcast), the shopping content display unit 430 may display at least one of a thumbnail image and the broadcast start time for shopping contents, or replay a broadcast preview video for the shopping contents in at least a certain area of a user interface. In this case, the shopping content display unit 430 may display the notification setting button in at least a certain area of the user interface.

The shopping content display unit 430 may determine whether or not at least a certain area of the user interface associated with the shopping contents is displayed on the display while meeting or exceeding a preset reference, and automatically replay a broadcast video for the shopping contents according to the determination result. For example, when determining that the broadcast start time for the shopping contents is before the reference time point, and that at least a certain area of the user interface associated with the shopping contents is displayed on the display while meeting or exceeding the preset reference, the shopping content display unit 430 may automatically replay a broadcast video for the shopping contents. On the other hand, when determining that the broadcast start time of the shopping contents is before the reference time point, but that at least a certain area of the user interface is displayed on the display less than the preset reference, the shopping content display unit 430 may display, on the display, at least one of the thumbnail image, the broadcast start time, and the replay time for the shopping contents.

In addition, when the user input processing unit 410 receives and processes the user input for shopping contents, the shopping content display unit 430 may display a screen that provides a broadcast video for the shopping contents that has already been broadcast or is being broadcast. At this time, when broadcasting for the shopping contents is currently being transmitted, the shopping content display unit 430 may display a screen providing a broadcast video of the shopping contents in real time.

When the user input processing unit 410 receives and processes the user input for the broadcast start notification, the broadcast start notifying unit 440 may set the broadcast start notification for the shopping contents having the broadcast start time that is after the reference time point. When the reference time point reaches the broadcast start time or a predetermined time before the broadcast start time for the shopping contents, the broadcast start notifying unit 440 may output the broadcast start notification for the shopping contents. For example, the broadcast start notification for the shopping contents may be outputted at the broadcast start time and/or 5 minutes before the broadcast starts. The broadcast start notifying unit 440 may display the broadcast start notification in the form of a pop-up notification on the display of the user terminal 210 or output a notification sound through the speaker of the user terminal.

Figure 5:
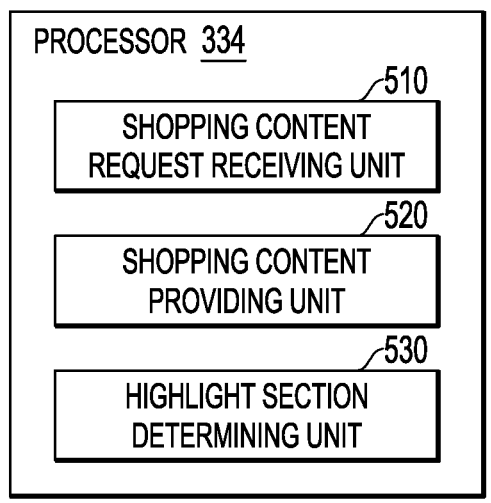
FIG. 5 is a block diagram illustrating an internal configuration of a processor of the information processing system according to an embodiment.

FIG. 5 is a block diagram illustrating an internal configuration of the processor 334 of the information processing system 230 according to an embodiment. As illustrated, the processor 334 may include a shopping content request receiving unit 510, a shopping content providing unit 520, and a highlight section determining unit 530.

The shopping content request receiving unit 510 may receive a request for shopping contents associated with a specific date from the user terminal 210. In accordance with the received request as described above, the shopping content providing unit 520 may extract one or more shopping contents associated with the specific date and provide the same to the user terminal 210. According to an embodiment, the shopping content providing unit 520 may extract one or more shopping contents associated with the specific date stored in an internal memory 332 of the information processing system 230 and/or an external system connected to the information processing system, and an external storage device, and provide the same to the user terminal 210. For example, the shopping content providing unit 520 may provide a pre-recorded broadcast video for the shopping contents associated with the specific date to the user terminal 210. According to another embodiment, in the case of shopping contents that are currently being broadcast live, the shopping content providing unit 520 may provide a broadcast video of the shopping contents to the user terminal 210 in real time.

The highlight section determining unit 530 may determine a highlight section of the broadcast video for the shopping contents. According to an embodiment, the highlight section determining unit 530 may receive a user response to the shopping contents and determine a highlight section of the broadcast video based on the same. For example, the highlight section determining unit 530 may determine, as a highlight section, a certain section of the live broadcast and/or a pre-recorded broadcast video for the shopping contents that received the largest number of positive responses (e.g., the number of likes, the number of product sales, the number of instant viewers, and so on). The highlight section of the broadcast video for the shopping contents determined as described above may be stored in the memory 332 and provided to the user terminal 210.

Figure 6:
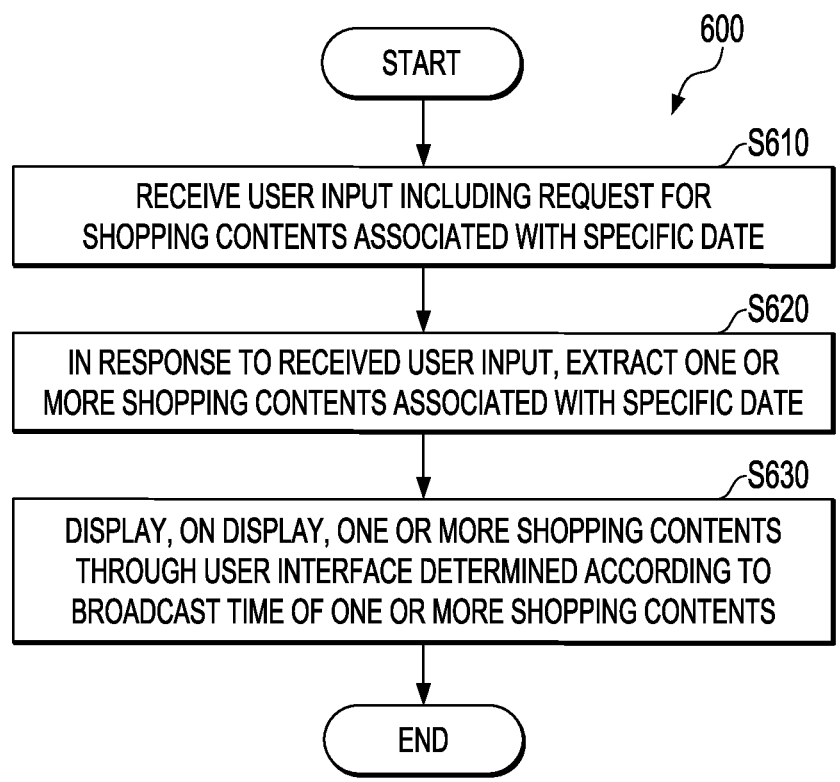
FIG. 6 is a flowchart illustrating a method for providing shopping contents according to an embodiment.

FIG. 6 is a flowchart illustrating a method 600 for providing shopping contents according to an embodiment. According to an embodiment, the method 600 for providing shopping contents may be performed by the processor 314 of the user terminal 210 and/or the processor 334 of the information processing system 230.

As illustrated, the method 600 for providing shopping contents may be initiated by the processor 314 receiving a user input including a request for shopping contents associated with a specific date, at S610. According to an embodiment, in response to the received user input, the processor 314 may display, on the display of the user terminal 210, a calendar including a specific date. In an example, the specific date may be today's date. According to another embodiment, the processor 314 may display, on the display of the user terminal 210, a calendar including one or more dates on which the shopping contents are available, and receive, on the calendar, a user input for a specific date.

In response to the received user input, the processor 314 may extract one or more shopping contents associated with the specific date, at S620. In this example, the shopping contents may include at least one of video content for broadcasting the shopping contents, broadcast time information, broadcast status information, product information, and user response information.

After that, the processor 314 may display one or more shopping contents on the display of the user terminal 210 through a user interface that is determined according to the broadcast time of the one or more shopping contents, at S630. For example, when the processor 314 extracts a plurality of shopping contents associated with the specific date, the processor 314 may arrange the plurality of shopping contents in the order of broadcast start time and display these on the display of the of the user terminal 210. According to an embodiment, the processor 314 may display the one or more shopping contents on the display by selecting a different user interface according to the before-and-after relationship between the broadcast time of the one or more shopping contents and the reference time point. In an example, the reference time point may be the current time. For example, when the broadcast start time of the shopping contents is before the reference time point, the processor may replay a broadcast video for the shopping contents in at least a certain area of the user interface. In addition, while replaying the broadcast video for the shopping contents, the processor 314 may also display together, on the user interface, at least one of a replay time of the broadcast video, a real-time broadcast indicator, and the number of viewers of the real-time broadcast video. As another example, when the broadcast start time of the shopping contents is after the reference time point, the processor 314 may display, on the display, at least one of a thumbnail image and the broadcast start time of the shopping contents, or may replay a broadcast preview video for the shopping contents in at least a certain area of the user interface.

As described above, when the broadcast start time for the shopping contents is before the reference time point, the processor 314 may replay the broadcast video for the shopping contents in at least a certain area of the user interface. According to an embodiment, when at least a certain area of the user interface is displayed on the display of the of the user terminal 210 while meeting or exceeding the preset reference (e.g., the screen exposure ratio of the user interface, the screen exposure size of the user interface, the screen exposure time of the user interface), the processor 314 may automatically replay a broadcast video for shopping contents. On the other hand, when at least a certain area of the user interface is displayed on the display less than the preset reference, the processor 314 may display at least one of a thumbnail image, a broadcast start time, and a replay time for the shopping contents on the display. According to an embodiment, the processor may receive a user input for one or more shopping contents and, in response to the received user input, display on the display a screen providing a broadcast video for the shopping contents. In an example, when the broadcast end time of the shopping contents is after the reference time point, the processor may display, on the display, a screen providing a real-time broadcast video for the shopping contents.

According to an embodiment, when the broadcast start time of the shopping contents is after the reference time point, the processor 314 may display the notification setting button in at least a certain area of the user interface, and in response to a user input for the notification setting button, set the broadcast start notification for shopping contents. After that, when the reference time point reaches a broadcast start time or a predetermined time before the broadcast start time for the shopping contents, the processor 314 may output a broadcast start notification for the shopping contents.

Figure 7:
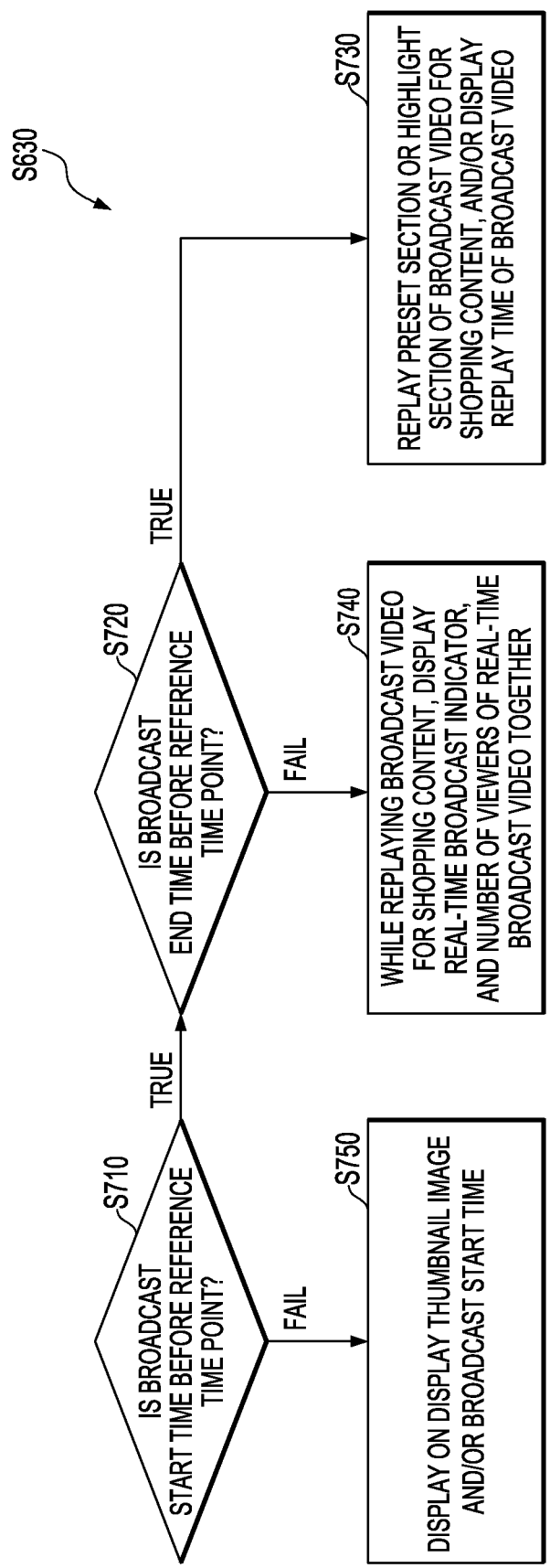
FIG. 7 is a flowchart illustrating steps for displaying the shopping contents on a display using different user interfaces according to broadcast times according to an embodiment.

FIG. 7 is a flowchart illustrating the step (S630) of displaying the shopping contents on the display using different user interfaces according to broadcast times according to an embodiment. According to an embodiment, the step (S630) may be performed by the processor 314 of the user terminal 210 and/or the processor 334 of the information processing system 230.

As illustrated, the processor 314 may determine whether or not the broadcast start time for the shopping contents is before the reference time point, at S710. In addition, the processor 314 may determine whether or not the broadcast end time for the shopping contents is before the reference time point, at S720. Accordingly, when the broadcast start time and the broadcast end time are before the reference time point, the processor 314 may replay a preset section or a highlight section of the broadcast video for the shopping contents. In addition, the processor 314 may display the replay time of the broadcast video on the user interface, at S730. In an example, the highlight section may be determined based on a user response to the broadcast video. For example, the highlight section may be a 5-second section in which the largest number of products are purchased, a 10-second section in which the largest number of comments are input, and a 10-second section in which the largest number of likes are clicked, during the real-time broadcast of the shopping contents and/or during the replay of the pre-recorded broadcast. In addition, the preset section may include a section determined according to a criteria that is applied equally to broadcast videos for all shopping contents (e.g., an initial 10-second section of the broadcast video) or a section directly designated by the user with respect to the broadcast video for each of the shopping contents. The preset section or highlight section may be a section obtained by combining a plurality of discontinuous sections in the broadcast video.

In contrast, when the broadcast start time is before the reference time point and the broadcast end time is after the reference time point, the processor 314 may replay a real-time broadcast video for the shopping contents in at least a certain area of the user interface. In addition, the processor 314 may display at least one of the real-time broadcast indicator and the number of viewers of the real-time broadcast video (that is, the number of real-time viewers) on the user interface, at S740. For example, at least one of the real-time broadcast indicator and the number of real-time viewers may be displayed in an overlapping manner either semi-transparently or opaquely on the broadcast video in an area where the broadcast video is being replayed on the user interface. In another example, at least one of the real-time broadcast indicator and the number of real-time viewers may be displayed around the area where a broadcast video is being replayed on the user interface.

In contrast, when the broadcast start time of the shopping contents is after the reference time point, the processor 314 may display, on the display, at least one of the thumbnail image and the broadcast start time for the shopping contents, at S750. Alternatively, the processor 314 may replay a broadcast preview video for the shopping contents in at least a certain area of the user interface.

Figure 8:
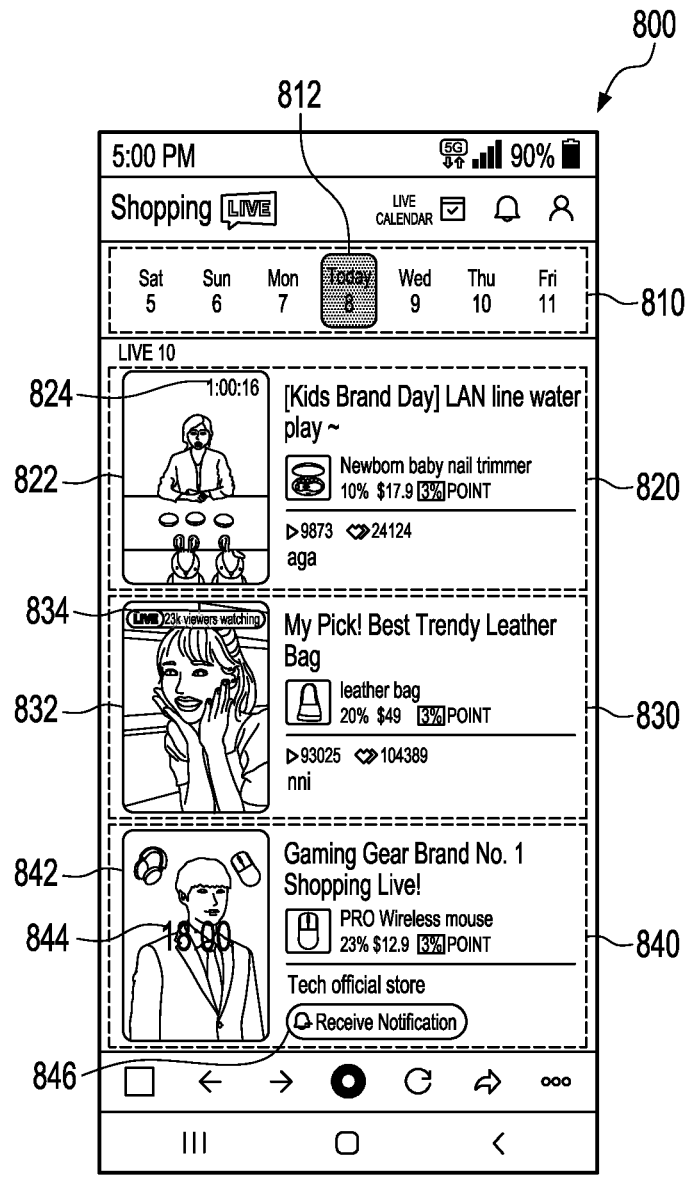
FIG. 8 is a diagram illustrating an example of providing the shopping contents associated with a specific date according to an embodiment.

FIG. 8 is a diagram illustrating an example of providing the shopping contents associated with a specific date 812 according to an embodiment. According to an embodiment, the processor 314 may receive a user input through a button (not illustrated) associated with a service for providing shopping contents, and in response to the received user input, extract one or more shopping contents associated with today's date 812. Alternatively, the processor 314 may receive a user input for today's date 812 on a calendar 810 that includes today's date 812 and displayed on the display of the user terminal 210, and in response to the received user input, extract one or more shopping contents associated with today's date 812.

After that, the processor 314 may display the calendar 810 including today's date 812 and the one or more shopping contents associated with today's date 812 on the display. As illustrated, on the calendar 810, a highlight indicator and an indicator "Today" may be displayed on today's date "8" 812. In addition, the video content, the broadcast time information, the broadcast status information, the product information, the user response information and the like for broadcasting of the shopping contents may be displayed on user interfaces 820, 830 and 840 associated with each of the shopping contents. For example, a broadcast start time, a product price, a discount rate, a point accumulation information, a brand, a seller, a product image, the number of viewers, the number of likes, and so on may be displayed on the user interfaces 820, 830 and 840 associated with each of the shopping contents. The broadcast time information, the broadcast status information, the product information, the user response information, and so on may be displayed in different colors on the user interfaces 820, 830 and 840 according to the before-and-after relationship between the broadcast start time of the shopping contents and the reference time point. For example, the broadcast start time of the shopping contents, which is before the reference time point, may be displayed in color with a high brightness, and the broadcast start time of shopping contents, which is after the reference time point, may be displayed in color with a low brightness.

The one or more shopping contents associated with today's date 812 displayed on the display may include at least one of shopping contents that have already been broadcast at the reference time point, shopping contents that are being broadcast, and shopping contents that are scheduled to be broadcast. One or more shopping contents may be displayed on the display by selecting different user interfaces 820, 830 and 840 according to the before-and-after relationship between the broadcast time of one or more shopping contents and the reference time point, that is, according to the broadcast status.

As illustrated, on a screen 800, a preset section or a highlight section of the broadcast video for the shopping content "[Kids Brand Day] LAN line water play~" that has already been broadcast at the reference time point may be replayed in at least a certain area 822 of the first user interface 820. For example, an initial 10 second section of the broadcast video for the shopping contents may be replayed. Along with the replay of the broadcast video, a total replay time "1:00:16" 824 of the broadcast video may be displayed on the first user interface 820.

In addition, a real-time broadcast video of the shopping content "My Peek! Best Trendy Leather Bag" currently being broadcast may be replayed in at least a certain area 832 of the second user interface 830. Along with the replay of the real-time broadcast video, a real-time broadcast indicator "LIVE" and the number of real-time viewers "23,000 watching" 834 may be displayed on the second user interface 830.

In addition, a thumbnail image and a broadcast start time "18:00" 844 for the shopping content "Gaming Gear Brand No. 1 Shopping Live!" that is scheduled to be broadcast may be displayed in at least a certain area 842 of the third user interface 840. Alternatively, a broadcast preview video (not illustrated) for the shopping content that is scheduled to be broadcast may be replayed in at least the certain area 842 of the third user interface 840. In this case, a notification setting button 846 for a broadcast start notification of the shopping content that is scheduled to be broadcast may be displayed in at least a certain area of the third user interface 840.

As illustrated in FIG. 8, a plurality of shopping contents may be arranged and displayed on the display in the order of broadcast start times, but not limited thereto. For example, a plurality of shopping contents may be arranged and displayed on the display based on user responses such as purchase ranking, popularity ranking, comment ranking, and so on. As another example, a plurality of shopping contents may be arranged and displayed on the display in order based on a relationship determined based on activity information, interest information, and so on, of the user.

Figure 9:
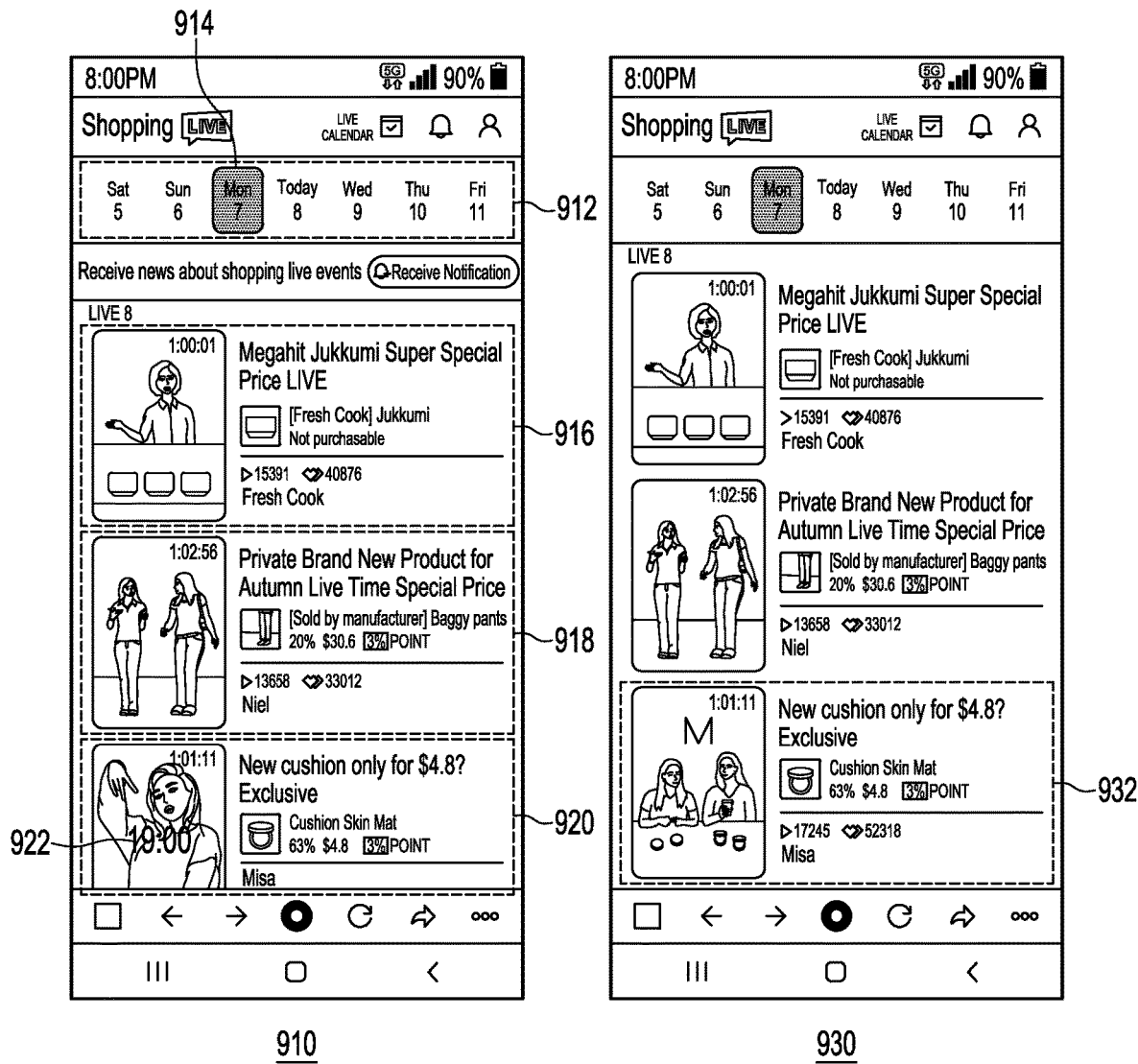
FIG. 9 is a diagram illustrating an example of providing the shopping contents associated with a specific date according to another embodiment.

FIG. 9 is a diagram illustrating an example of providing shopping contents associated with a specific date 914 according to another embodiment. The processor 314 may receive a user input for the specific date 914 on a calendar 912 displayed on the display of the user terminal 210, which includes one or more dates on which the shopping contents are available, and in response to the received user input, extract one or more shopping contents associated with the specific date 914. After that, the processor 314 may display one or more shopping contents associated with the specific date 914 on the display. In an example, on the calendar 912, a number, a day of the week, and an indicator "Today" corresponding to a date when the shopping contents are available may be displayed. In FIG. 9, the processor 314 may receive a user input for a specific date "7" 914 on the calendar 912 displayed on the display including "5", "6", "7", "8", "9", "10", "11" which are the dates on which the shopping contents are available, and in response to the received user input, extract the shopping contents associated with the specific date "7" 914. After that, the processor 314 may display one or more shopping contents associated with the specific date "7" 914 on the display. In addition, as illustrated, a highlight indicator may be displayed on the specific date "7" 914 on the calendar 912.

In FIG. 9, the specific date "7" 914 corresponds to a date in the past from the reference time point, and the shopping contents associated with the specific date "7" 914 may include one or more shopping contents for which broadcasts have been completed. Therefore, as described with reference to FIG. 8, a preset section or a highlight section of the broadcast video for each of the shopping contents "Megahit Jukkumi Super Special Price LIVE" and "Private Brand New Product for Autumn Live Time Special Price" that has already been broadcast at the reference time point may be replayed in at least a certain area of a first user interface 916 and a second user interface 918 associated with each of the shopping contents.

According to an embodiment, when at least a certain area of the user interface is displayed on the display while meeting or exceeding a preset reference, the processor 314 may automatically replay a broadcast video for the shopping contents. On the other hand, when at least a certain area of the user interface is displayed on the display less than the preset reference, the processor 314 may display at least one of a thumbnail image, a broadcast start time, and a replay time for the shopping contents on the display. For example, it is assumed that ⅔ of the user interface area is preset as a broadcast video replay reference, and in this case, when ⅔ or more of the user interface area associated with the shopping contents is displayed on the display of the user terminal 210, the broadcast video for the shopping contents may be automatically replayed, and when less than ⅔ is displayed on the display, the broadcast video for the shopping contents may not be replayed, and at least one of the thumbnail image, the broadcast start time and the replay time may be displayed on the display. These broadcast video replay references may be different between upper and lower portions of the user interface. For example, it may be set such that the broadcast video is automatically replayed only when ⅔ or more of the upper portion of the user interface area is displayed on the display, while the broadcast video is replayed when ¼ or more of the lower portion is displayed on the display.

For example, as illustrated, on the first screen 910, since only an area less than ⅚ of the third user interface area 920 associated with the shopping content "New cushion only for $4.8? Exclusive" is displayed on the display, a thumbnail image with the broadcast start time "19:00" 922 and the replay time "1:01:11" of the shopping content "New cushion only for $4.8? Exclusive" is displayed on the display, and the broadcast video is not automatically replayed. On the second screen 930, which is changed from the first screen 910 with a scroll or touch slide operation on the first screen 910, since an area that is ⅚ or more of the third user interface area 932 associated with the shopping contents "New cushion only for $4.8? Exclusive" is displayed on the display, the broadcast video for the shopping content "New cushion only for $4.8? Exclusive" may be automatically replayed.

Figure 10:
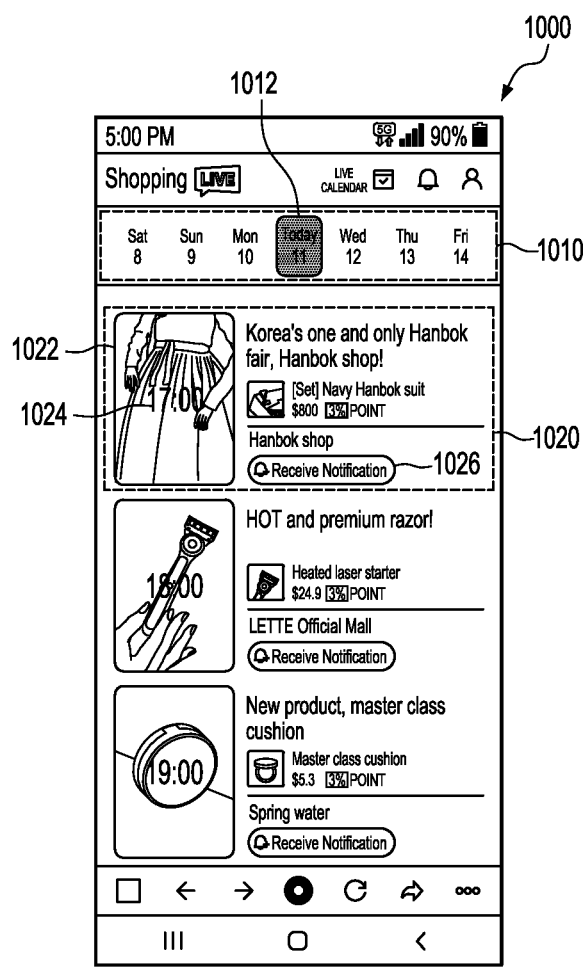
FIG. 10 is a diagram illustrating an example of providing the shopping contents associated with a specific date according to still another embodiment.

FIG. 10 is a diagram illustrating an example of providing shopping contents associated with a specific date 1012 according to still another embodiment of the present disclosure. In FIG. 10, as shown in a screen 1000, the processor 314 may receive a user input for a specific date "11" 1012 on a calendar 1010 displayed on the display of the user terminal 210 including "8", "9", "10", "11", "12", "13", "14" which are the dates on which the shopping contents are available, and in response to the received user input, extract the shopping contents associated with the specific date "11" 1012. After that, the processor 314 may display one or more shopping contents associated with the specific date "11" 1012 on the display of the user terminal 210. In addition, as illustrated, a highlight indicator may be displayed on the specific date "11" 1012 on the calendar 1010.

In FIG. 10, the specific date "11" 1012 corresponds to a date in the future from the reference time point, and the shopping contents associated with the specific date "11" 1012 may include one or more shopping contents scheduled to be broadcast. According to an embodiment, a plurality of shopping contents may be arranged and displayed on the display of the user terminal 210 in the order of broadcast start time. For example, as illustrated, shopping content "Korea's one and only Hanbok fair, Hanbok shop!" having the broadcast start time of 17:00, shopping content "HOT and premium razor!" with 18:00, and shopping contents "New product, Master Class Cushion" with 19:00 may be vertically arranged and displayed on the display of the user terminal 210 in order. Alternatively, the plurality of shopping contents may be horizontally arranged and displayed on the display of the user terminal 210 in the order of broadcast start time.

According to an embodiment, when the broadcast start time of the shopping contents is after the reference time point, at least one of the thumbnail image, a broadcast start time 1024 and a notification setting button 1026 for the shopping contents may be displayed on a user interface 1020. For example, on the screen 1000 as illustrated in FIG. 10, a thumbnail image for the shopping content "Korea's one and only Hanbok fair, Hanbok shop!" scheduled to be broadcast may be displayed in at least a certain area 1022 of the user interface 1020, and a broadcast start time "17:00" 1024 may be displayed on the display of the user terminal 210 overlappingly with the thumbnail image. Alternatively, the thumbnail image may be displayed in at least the certain area 1022 of the user interface 1020 and the broadcast start time 1024 may be displayed on the left area of the thumbnail image.

Figure 11:
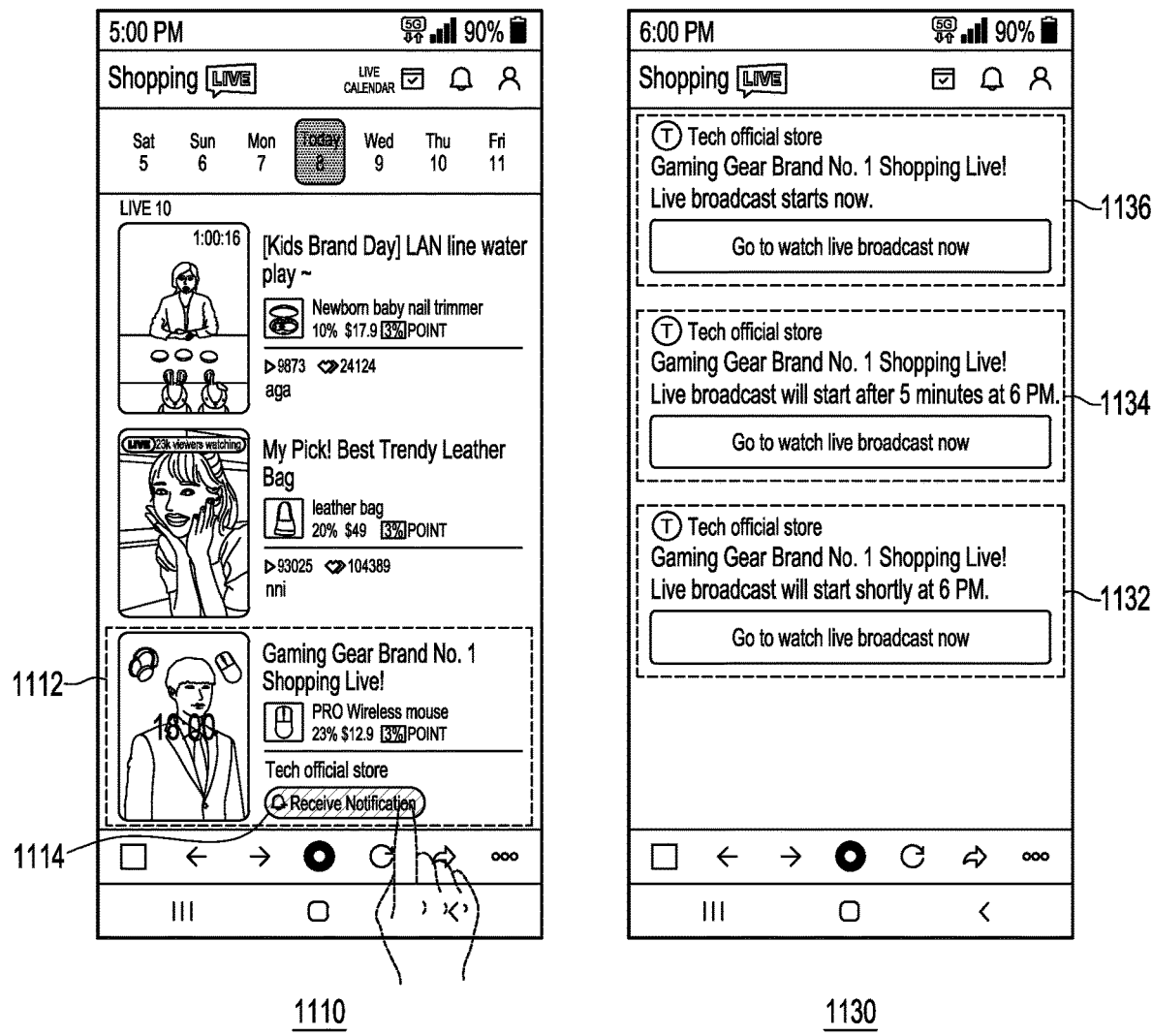
FIG. 11 is a diagram illustrating an example in which a broadcast start notification is output according to a broadcast start notification setting for shopping contents according to an embodiment.

FIG. 11 is a diagram illustrating an example in which broadcast start notifications 1132, 1134, 1136 are output according to a broadcast start notification setting for shopping contents according to an embodiment. According to an embodiment, when the broadcast start time of the shopping contents is after the reference time point, the processor 314 may display a notification setting button 1114 in at least a certain area of a user interface 1112, as shown in a first screen 1110. In addition, in response to a user input to the notification setting button 1114, the processor 314 may set a broadcast start notification for the corresponding shopping content. After that, when the reference time point reaches the broadcast start time or a predetermined time before the broadcast start time for the shopping content, the processor 314 may output the broadcast start notifications 1132, 1134, 1136 for the shopping contents, as shown in a second screen 1130.

As illustrated in the first screen 1110, the user may touch-input the notification setting button 1114 for the shopping content "Gaming Gear Brand No. 1 Shopping Live!" having the broadcast start time that is after the reference time point. In response to such a user input, the processor 314 may set the broadcast start notification for the corresponding shopping contents. For example, the processor 314 may set broadcast start notifications for 18:00, which is the broadcast start time, 17:55, which is 5 minutes before the broadcast start time, and 17:00, which is one hour before the broadcast start time. After that, when the reference time point reaches the time(s) for which the notification is set, the broadcast start notifications 1132, 1134, 1136 for the shopping contents may be output. For example, as illustrated in the second screen 1130, when the current time reaches 17:00, 17:55, and 18:00, on the screen 1130 associated with the broadcast start notification, a message for announcing the start of broadcasting for the shopping content, such as "Gaming Gear Brand No. 1 Shopping Live!" live broadcast will start shortly at 6 PM" 1132, "Gaming Gear Brand No. 1 Shopping Live!" live broadcast will start in 5 minutes at 6 PM." 1134, "Gaming Gear Brand No. 1 Shopping Live!" live broadcast starts now." 1136, and so on may be displayed. In FIG. 11, the example of the broadcast start notification output is illustrated in which the message announcing the start of broadcasting is displayed on the screen 1130 associated with the broadcast start notification, but embodiments are not limited thereto. For example, the broadcast start notification message may be displayed on the display of the user terminal 210 in the form of a pop-up window, or a notification sound may be output through a speaker, or a vibration may be output to the user terminal 210.

Figure 12:
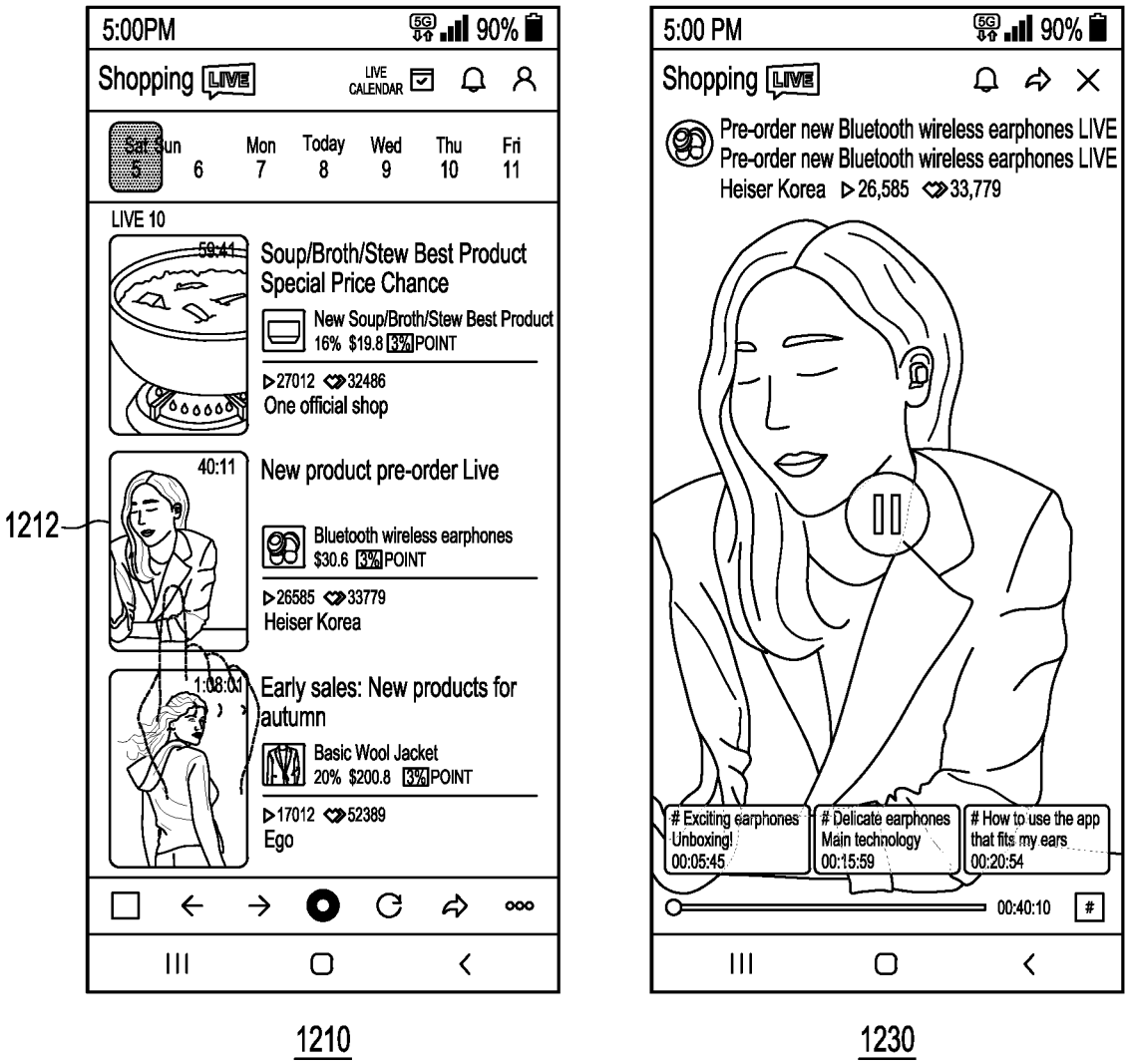
FIG. 12 is a diagram illustrating an example in which a screen providing a broadcast video is displayed on a display according to a user input for shopping contents according to an embodiment.

FIG. 12 is a diagram illustrating an example in which a screen 1230 providing a broadcast video is displayed on the display according to a user input for shopping contents according to an embodiment. According to an embodiment, the processor 314 may receive user input for one or more shopping contents displayed on the display of the user terminal 210. When the broadcast start time of the shopping content for which the user input is received is before the reference time point, in response to the received user input, the processor 314 may display on the display a screen 1230 providing a broadcast video for the shopping content. In particular, when the broadcast end time for the corresponding shopping content is after the reference time point, that is, when the shopping content is currently being broadcast in real time, the processor 314 may display on the display the screen 1230 providing a real-time broadcast video for the shopping contents.

As illustrated in the first screen 1210, among the user interfaces associated with the shopping content "New product pre-order Live" displayed on the display, a user's touch input may be received for a certain area 1212 in which the broadcast video is being replayed. In response, the second screen 1230 providing a pre-recorded broadcast video for the shopping content "New product pre-order Live" that has been broadcast may be displayed on the full screen of the display.

The method for providing shopping contents described above may be provided as a computer program stored in a computer-readable recording medium for execution on a computer. The medium may continuously store a program executable by a computer or temporarily store a program for execution or download. In addition, the medium may be a variety of recording means or storage means in a form in which a single piece of hardware or several pieces of hardware are combined, but is not limited to a medium directly connected to any computer system, and may be present on a network in a distributed manner. An example of the medium includes any that is configured to store program instructions, which may include a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the methods, operations, or techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. A general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the methods, operations, or techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method for providing, on a user terminal, contents broadcasted on a specific date, the method performed by one or more processors, comprising:
   receiving, from the user terminal, a user input including a request for contents associated with the specific date;
   in response to the received user input, extracting one or more contents associated with the specific date; and
   displaying, on a display of the user terminal, the extracted one or more contents through a user interface determined according to a broadcast time of the specific date of the extracted one or more contents,
   wherein the displayed contents includes at least one first broadcast video having a broadcast start time and a broadcast end time before a predetermined reference time point, at least one second broadcast video having a broadcast start time and a broadcast end time after the predetermined reference time point, and at least one third broadcast video which has a broadcast start time before the predetermined reference time point and a broadcast end time after the predetermined reference time point,
   wherein the at least one first broadcast video, the at least one second broadcast video and the at least one third broadcast video are displayed simultaneously on the display responsive to the receipt of the user input including the request for contents associated with the specific date, the first broadcast video being displayed in a first certain area of a user interface as a thumbnail image along with a time indicating a length of a replay time of the first broadcast video, wherein the first certain area meets or exceeds a preset reference size, the second broadcast video being displayed in a second certain area of a user interface as a thumbnail image along with the broadcast start time of the second broadcast video and a notification setting button for requesting notice of the broadcast start time, and the at least one third broadcast video being automatically replayed on a third certain area of the user interface along with a display of a number indicating real-time viewers watching the third broadcast video, and
   wherein responsive to the first certain area of the user interface meeting or exceeding the preset reference size, automatically replaying, on the display, the first broadcast video without modifying a layout of the user interface, and displaying the length of the replay time of the first broadcast video.

2. The method according to claim 1, wherein the at least one of the displayed contents include at least one of product information and user response information.

3. The method according to claim 1, wherein
   a preset section or a highlight section of the first broadcast video is replayed, and the highlight section is determined based on a user response to the first broadcast video.

4. The method according to claim 1, wherein
   the third broadcast video is replayed in real-time in the third certain area of user interface of the third broadcast video.

5. The method according to claim 1, further comprising:
   receiving a user input for the extracted one or more contents; and
   responsive to a broadcast start time for the contents for which the user input is received being before the reference time point, displaying on the display a screen providing the first broadcast video for the contents for which the user input is received.

6. The method according to claim 5, wherein
responsive to a broadcast end time of the contents for which the user input is received being after the reference time point, providing the third broadcast video in real time.

7. The method according to claim 1, wherein
responsive to a broadcast start time of the extracted one or more contents being after the reference time point, replaying a broadcast preview video for the second broadcast video in at least the second certain area of a user interface of the second broadcast video.

8. The method according to claim 1, wherein
in response to a user input to the notification setting button, setting a broadcast start notification for the second broadcast video; and
when the reference time point reaches the broadcast start time of the second broadcast video or a predetermined time before the broadcast start time, outputting the broadcast start notification for the second broadcast video.

9. The method according to claim 1, wherein the extracting of the one or more contents associated with the specific date includes:
extracting a plurality of contents associated with the specific date, and
wherein the displaying of the extracted one or more contents includes:
arranging the plurality of contents in an order of broadcast start time and displaying the arranged plurality of contents on the display.

10. The method according to claim 1, further comprising:
in response to the received user input, displaying on the display a calendar including the specific date,
wherein the specific date is today's date.

11. The method according to claim 1, further comprising:
displaying on the display a calendar including one or more dates on which contents are available, and
wherein the receiving the user input includes:
receiving a user input for the specific date on the calendar.

12. A non-transitory computer-readable recording medium for storing instructions for instructing at least one computer to execute the method for providing, on a user terminal, contents broadcasted on a specific date, as described in claim 1.

13. A user terminal for displaying contents broadcasted on a specific date, comprising:
a display;
a communication module;
a memory; and
one or more processors connected to the memory and configured to execute one or more computer-readable programs stored in the memory, wherein
the one or more programs include instructions for:
receiving, through the user terminal, a user input including a request for contents associated with the specific date;
in response to the received user input, extracting one or more contents associated with the specific date; and
displaying, on the display of the user terminal, the extracted one or more contents through a user interface determined according to a broadcast time of the specific date of the extracted one or more contents,
wherein the displayed contents includes at least one first broadcast video having a broadcast start time and a broadcast end time before a predetermined reference time point, at least one second broadcast video having a broadcast start time and a broadcast end time after the predetermined reference time point, and at least one third broadcast video which has a broadcast start time before the predetermined reference time point and a broadcast end time after the predetermined reference time point,
wherein the at least one first broadcast video, the at least one second broadcast video and the at least one third broadcast video are displayed simultaneously on the display responsive to the receipt of the user input including the request for contents associated with the specific date, the first broadcast video being displayed in a first certain area of a user interface as a thumbnail image along with a time indicating a length of a replay time of the first broadcast video, wherein the first certain area meets or exceeds a preset reference size, the second broadcast video being displayed in a second certain area of a user interface as a thumbnail image along with the broadcast start time of the second broadcast video and a notification setting button for requesting notice of the broadcast start time, and the at least one third broadcast video being automatically replayed along with a display of a number indicating real-time viewers watching the third broadcast video, and
wherein responsive to the first certain area of the user interface meeting or exceeding the preset reference size, automatically replaying, on the display, the first broadcast video without modifying a layout of the user interface, and displaying the length of the replay time of the first broadcast video.

* * * * *